Figure 1:
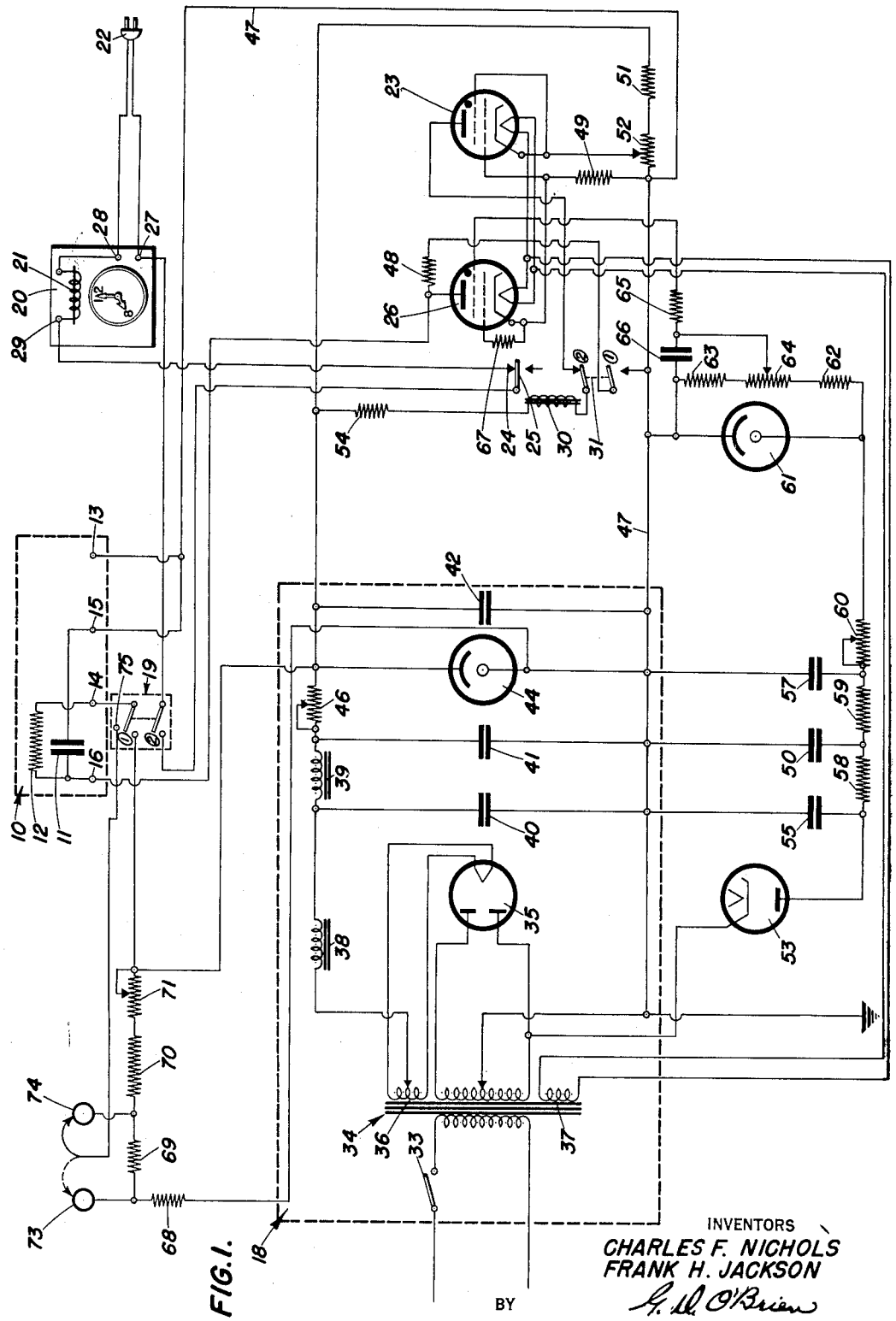

April 24, 1956

C. F. NICHOLS ET AL 2,743,418

RC CIRCUIT TESTER

Filed Dec. 29, 1945

2 Sheets-Sheet 1

INVENTORS
CHARLES F. NICHOLS
FRANK H. JACKSON

BY *G. D. O'Brien*

ATTORNEY

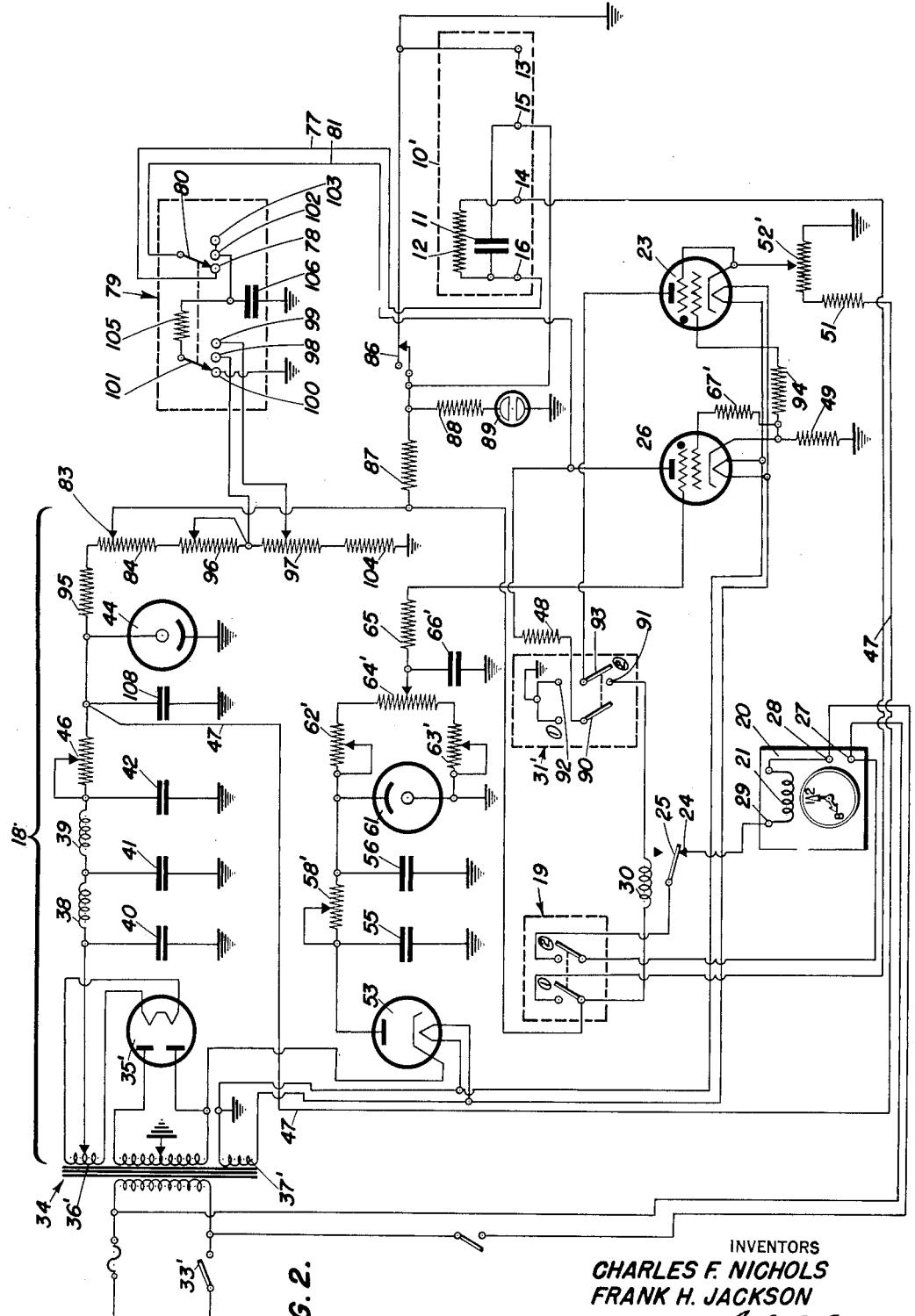

United States Patent Office 2,743,418
Patented Apr. 24, 1956

2,743,418

RC CIRCUIT TESTER

Charles F. Nichols, Webster, and Frank H. Jackson, Rochester, N. Y., assignors, by mesne assignments, to the United States of America as represented by the Secretary of the Navy Application December 29, 1945, Serial No. 638,391

1 Claim. (Cl. 324—68)

The present invention relates generally to testing arrangements and more particularly to devices for measuring the time interval between the instant of application of an electromotive force to a circuit including a capacitor and the instant of attainment of a predetermined voltage across the capacitor.

The present invention is essentially an improvement of the device disclosed in the copending patent application of Frank H. Jackson Serial No. 649,094, filed in the United States Patent Office on February 20, 1946 entitled "Testing Device," now issued as U. S. Patent No. 2,544,685 and assigned to the same assignee as the present application. In that copending application there is disclosed an arrangement in which a two-terminal discharge device is employed for causing a controlling potential difference to "trigger" a gas-filled grid-controlled relay tube. When the controlling potential difference exceeds a fixed critical value the latter tube discharges. Variation of the controlling potential difference is not suggested in that application, since the two-terminal device there disclosed has a fixed breakdown potential. In accordance with a feature of the present invention, there is substituted for the cold-cathode tube there disclosed a two-terminal device and associated circuits having such characteristics that the controlling potential difference causing relay tube breakdown may be varied.

It is an object of the present invention to provide an improved, simple, accurate and efficient device for measuring the time of charge of a capacitor.

It is also an object of the invention to provide a device of such character that it may readily be adjusted and set for operation at a time when the capacitor voltage attains a predetermined magnitude.

For a better understanding of the present invention, together with other and further objects thereof, reference is made to the following specification and claim and to the accompanying drawings in which:

Fig. 1 is a circuit schematic of a preferred embodiment of testing device in accordance with the present invention: and Fig. 2 is a circuit schematic of a modified embodiment of testing device in accordance with the present invention.

The testing device represented in Fig. 1 is explained in the light of the problem which it solves. It is designed to facilitate the conduct of production and laboratory tests of the performance of a device indicated generally at 10. This device includes a time-constant circuit comprising a capacitor 11 and a resistor 12 connected in series between terminals 14 and 15. Capacitor 11 is connected to terminals 15 and 16. Device 10 also has a grounded terminal 13. The testing device provided in accordance with the present invention has such operation that it measures the time interval between the instant of application of a known electromotive force between terminals 14, 15 (and across the R-C circuit comprising elements 11, 12) and the instant of attainment of some predetermined magnitude by the voltage between terminals 15, 16 (and across condenser 11).

In order to apply a known voltage to the R-C circuit at a particular time there is provided a power supply indicated generally at 18. The negative terminal of the power supply is connected to terminals 15 and 13 of the sample to be tested. The positive terminal is connected to terminal 14 through a first blade and set of contacts of a double-pole single-throw switch 19.

For the purpose of measuring the desired time interval there is provided a clock 20. This unit is a commercially available electrically-operated elapsed-interval timer having a magnetic clutch 21. The clutch is adapted to be energized to permit operation of the clock and it functions to stop the clock upon disconnection of the clutch coil from its source of excitation. Clock 20 is coupled to a 110 volt, 60 cycle, alternating current supply by a connector 22. When switch 19 is closed, the coil of clutch 21 is excited by the 110 volt source through a circuit comprising terminal 28, the coil, terminal 29, the normally closed contacts 24, 25 of a relay device, a second blade and set of contacts of switch 19 and terminal 27. This relay device comprises a gas-filled grid controlled tube 23 of the "thyratron" type and a conventional single-pole magnetic relay 30. It will thus be seen that at the time of application of a potential across terminals 14, 15 by the closing of switch 19, the magnetic clutch is energized and clock 20 starts running.

For the purpose of stopping the clock when the voltage across terminals 15, 16 has attained the predetermined magnitude, there is provided the relay arrangement 23, 30 for utilizing this voltage to open the contacts 24, 25. This arrangement is triggered by a discharge device 26, specifically a gas-filled grid-controlled tube of the "thyratron" type and having a variable breakdown characteristic. The cathode-anode breakdown path of this tube is included in circuit between terminals 15 and 16. This breakdown path is serially connected with resistor 49 between terminal 16 and ground. Upon attainment of the predetermined voltage magnitude, device 26 breaks down and there is applied to the input circuit of tube 23 substantially all of the potential across condenser 11. Tube 23 is "triggered," anode current flows therein, this current flowing in the winding of relay 30 trips it and opens contacts 24, 25, disconnecting the coil of clutch 21 from its source of excitation and stopping the clock. Clock 20 therefore measures the interval between the closing of switch 19 (and the application of electromotive force to the R-C circuit) and the attainment of the predetermined magnitude by the voltage across condenser 11 (and the opening of the contacts of relay 30).

Referring now to the specific circuit components by which the aforementioned objects are accomplished, power supply 18 comprises a conventional "on-off" switch 33 and a power transformer 34 coupled to the 110 volt source. Transformer 34 includes a high voltage secondary coupled to the anodes of a rectifier tube 35 and having a grounded center tap. A secondary winding 36 furnishes filament current for tube 35 and a secondary winding 37 furnishes filament current for tubes 23 and 26. The high-potential supply line is connected to a center tap on secondary 36. The filtering section comprises series chokes 38, 39 and shunt condensers 40, 41 and 42. Unit 18 also includes a voltage-regulating output circuit comprising a conventional voltage regulating tube 44 in series with a variable resistor 46. Since it is desired to apply a known potential across terminals 14, 15 for charging the R-C circuit, terminal 14 is coupled through the above-mentioned first blade and set of contacts of switch 19 to the anode of voltage regulating tube 44 and terminal 15 is grounded by conductor 47.

Since it is necessary to employ the potential between terminals 15 and 16 to cause breakdown of discharge device 26 and to trip the relay comprising elements 23, 30, terminal 16 is connected to the anode of tube 26 and the path between terminals 16 and 15 is completed through this anode, the cathode of tube 26, resistor 49 and conductor 47. During a resetting operation, when the device is being prepared for a measurement, the junction of the connections between terminal 16 and the anode of tube 26 is connected through a resistor 48 and a first blade and set of contacts of a switch 31 to ground. This connection permits the discharge of condenser 11 during the resetting operation. During the measuring operation the circuit including this first blade and set of contacts of switch 31 is open and the potential between terminals 15 and 16 appears across resistor 49 and the high impedance of the discharge circuit of tube 26. Upon breakdown of tube 26 substantially all of the last-mentioned potential appears across resistor 49, connected between the control electrode of tube 23 and ground, since the impedance of tube 26 decreases and the potential drop between its anode and cathode is then negligible. The potential appearing across resistor 49 is employed to render the control electrode of tube 23 more positive. This electrode is normally biased negatively by unit 13 through a biasing circuit comprising a series arrangement of resistor 51 and variable resistor 52, connected between the high voltage terminal of unit 18 and ground. To this end the cathode of tube 23 is connected to a desired point on resistor 52. The tap on resistor 52 and therefore the cathode of tube 23 are biased to be more positive than that terminal of resistor 49 remote from ground and therefore more positive than the control electrode of tube 23. The shielding electrode of tube 23 is connected to the cathode. The plate current of tube 23 is employed for exciting the winding of relay 30, causing contact 25 to be separated from contact 24 and attracted to the magnetic core disposed within the relay winding. This breaking of the circuit between the 110 volt source and the magnetic clutch, deenergizes the magnetic clutch, and stops clock 20. In order to accomplish these objectives during the measuring operation the anode of tube 23 is connected through a second blade and set of contacts of switch 31, the winding of relay 30, and a dropping resistor 54 to the high-potential side of power supply 18. The discharge path of tube 23 is completed by connecting the cathode to ground through a portion of resistor 52. During the resetting operation the circuit comprising this second blade and set of contacts of switch 31 is opened and anode current flow in tube 23 stops.

The Fig. 1 embodiment departs substantially from the testing device disclosed in the above-mentioned copending application in the provision of the gas-filled grid-biased tube 26. In order to allow adjustment of the voltage across the condenser 11 at which the tube 26 will break down and conduct current, its shielding electrode is connected to an adjustable bias supply. This bias supply comprises a half-wave rectifying tube 53, having its cathode connected to one terminal of the high voltage secondary of transformer 34, a filtering section comprising shunt condensers 55, 56, and 57, series resistors 58 and 59 and series variable resistor 60, and a regulating section comprising a voltage regulating tube 61. The cathode of tube 61 is more negative than ground and is connected to resistor 60. Shunted across regulating tube 61 is a potentiometer comprising resistors 62, 63 and resistor 64. This shielding electrode to tube 26 is connected through a resistor 65 to a sliding contact on resistor 64. Since this tap is more negative than ground, the shielding electrode is more negative than the cathode of tube 26. This bias may be varied as desired by an appropriate setting of resistor 64. The control electrode of tube 26 is connected to the cathode by a resistor 67. Condenser 66 is connected between the sliding contact on resistor 64 and ground.

The Fig. 1 embodiment also includes an arrangement for facilitating the predetermination of the bias on tube 26. This arrangement comprises a serially connected set of resistors 68, 69, 70 and 71, the last one being variable, connected between the cathode and anode of voltage regulating tube 44, and two test jacks 73 and 74. Jack 73 is adapted to couple the junction of resistors 68 and 69 through the first-mentioned blade and an additional contact 75 on switch 19 to terminal 14 and jack 74 is so connected to the junction of resistors 69 and 70 as similarly to couple that junction to contact 75, and thus to terminal 14.

Let it be assumed that it is desired to calibrate the testing device. A standard similar to the production samples to be tested is employed as component 10. The calibration process consists in a determination of the screen-grid bias of tube 26 in such manner that tube 26 breaks down when the capacitor in the R-C circuit of the standard is charged to a potential (say 67.5 volts) slightly higher than a predetermined potential (say 66.25 volts), but does not break down when the charging potential is slightly below this value (say 65 volts). However, the screen-grid need not necessarily be the controlling medium since the same effect can be achieved by using a convenient fixed screen-grid voltage and a variable (negative or positive) control grid voltage. When the flexible lead (connected to contact 75) is connected to jack 73, then the lower potential is applied to terminals 14—15. When the lead is connected to jack 74, then the higher potential is similarly applied. The test voltages are used only during calibration. In measuring and testing the whole regulator output voltage (90 volts) is applied to terminals 14—15. In the calibrating operation the second blade and set of contacts of switch 19 are in their position for the measuring operation, completing the clutch-exciting circuit between contacts 27 and 29, but the first blade of switch 19 is thrown into contact with contact 75. By a setting of a tap on resistor 64 the bias on tube 26 is adjusted so that the tube does not break down when jack 73 is inserted but so that the tube breaks down when jack 74 is inserted. It will be seen that the device provided in accordance with the present invention may readily be calibrated and adapted to production testing of samples 10.

While it is not proposed that the invention be limited to any specific circuit dimensions the following component characteristics have been found practicable in one successful embodiment of the type illustrated in Fig. 1:

| Component: | Characteristics |
| --- | --- |
| Input voltage to unit 18 | 110 volts, alternating current, 60 cycles per second. |
| Tube 35 | 5W4. |
| Chokes 38 and 39 | 15 henries. |
| Condensers 40, 41 and 42 | 8 microfarads each. |
| Tube 26 | Type 2051. |
| Tube 23 | Type 2051. |
| Resistor 54 | 25,000 ohms. |
| Resistor 48 | 2,000 ohms. |
| Resistor 49 | 20,000 ohms. |
| Resistor 52 | 5,000 ohms. |
| Resistor 51 | 200,000 ohms. |
| Resistor 46 | 10,000 ohms. |
| Resistor 68 | 26,000 ohms. |
| Resistor 69 | 1,000 ohms. |
| Resistor 70 | 7,800 ohms. |
| Resistor 71 | 5,000 ohms, variable. |
| Resistor 65 | 50,000 ohms. |
| Resistor 63 | 750 ohms. |
| Resistor 64 | 1,000 ohms. |
| Resistor 62 | 50,000 ohms. |
| Resistors 58 and 59 | 10,000 ohms, each. |
| Resistor 60 | 15,000 ohms, variable. |
| Capacitors 55, 56 and 57 | 8 microfarads, each. |
| Capacitor 66 | 5 microfarads. |
| Tube 53 | Type 1-V. |

| Component: | Characteristics |
|---|---|
| Tube 61 | Type VR105. |
| Switch 19 | Two gang, one blade having alternate contacts. |
| Switch 31 | Two gang. |
| Test voltages for predetermined condenser voltage of 66.25 volts. | 65 volts and 67.5 volts. |

Referring now to the operation of the device illustrated in Fig. 1, it will be assumed that contacts 24 and 25 are in circuit, that the coil of relay 30 is deenergized, that switch 19 is open, that switch 31 is in the measuring position with its second blade and set of contacts in circuit, that the testing device is properly connected to the sample 10 to be tested, and that tube 23 is biased to a nonductive state by the flow of current from unit 18 in resistor 52. Since switch 19 is open magnetic clutch 21 is not excited and clock 20 is stopped.

Upon the closing of switch 19 an electromotive source is applied between terminals 14 and 15 and condenser 11 begins to charge. Simultaneously the magnetic clutch coil is energized and clock 20 begins to run. Upon the attainment of the predetermined magnitude of the potential across condenser 11, the voltage between terminals 15 and 16 is sufficient to break down tube 26 and substantially the whole of that voltage appears across resistor 49, rendering the control electrode of tube 23 more positive. The latter tube is accordingly "tripped" and anode current flows therein, energizing the winding of relay 30 and breaking the circuit between contacts 24 and 25. Accordingly, the magnetic clutch winding is open-circuited and clock 20 is stopped. This occurs at the same instant as the attainment of the aforementioned predetermined potential across condenser 11. Therefore clock 20 effectively measures the time of charge of condenser 11 to this predetermined potential.

Reference is now made specifically to Fig. 2 wherein there is disclosed a modified embodiment of the present invention. Those elements of the Fig. 2 embodiment like in structure and function to corresponding Fig. 1 elements have the same reference numerals. Those Fig. 2 elements similar to corresponding Fig. 1 elements have like reference numerals primed.

The exciting path for the coil of clutch 21 comprises a voltage source (not shown), "on-off" switch 33', terminal 27, the second blade and set of contacts of switch 19, contacts 25—24, terminal 29, coil 21, and terminal 28, just as in the Fig. 1 embodiment. The exciting path for the coil of relay 30 begins at the anode of tube 23, and continues through blade 93 and contact 91 of switch 31', coil 30, and sliding contact 83 on resistor 84. The discharge path of tube 23 is completed by connecting the cathode to ground through a portion of resistor 52'. The circuit for applying a negative bias to the control electrode of tube 23 comprises conductor 47, resistor 51', resistor 52' and ground. During the measuring operation breakdown of tube 26 is effected by the voltage between terminals 15 and 16 (across condenser 11), this voltage being applied to a circuit comprising terminal 16, conductor 77, contact 78 of switch 79, switch arm 80, conductor 81, the anode-cathode path of tube 26, resistor 49 and ground, terminal 15 then being grounded by switch 86. The charging path for condenser 11 includes sliding contact 83 on resistor 84, the first blade and set of contacts of switch 19, terminal 14, resistor 12, condenser 11, terminal 15, microswitch 86 and ground.

The Fig. 2 embodiment is similar to the Fig. 1 embodiment in that switch 31' has a first blade and set of contacts which are open circuited during the testing operation but are closed during the resetting operation in order to connect condenser terminal 16 to ground through resistor 48, thereby permitting discharge of condenser 11. When switch 31' is thrown to the reset position blade 93 is separated from contact 91 and the plate circuit of tube 23 is opened, thereby stopping current flow. Switch 31' is provided with a contact 92, in communication with blade 93 during the resetting operation, for grounding the anode of tube 23.

While terminal 15 is externally grounded for testing purposes, it is often desirable that the existence of an internal ground in sample 10' and between terminals 15 and 13 be detected and prevented. For the purpose of detecting such undesired grounds there is provided a circuit, comprising a resistor 87, a resistor 88, a neon glow lamp 89 and ground; this circuit is so coupled to source 18' that the output voltage of the source appears thereacross. When switch 86 is closed, both sides of lamp 89 are grounded. The switch is closed during the time-measuring operation, but it may be opened at other times for the purpose of determining whether a potential difference between terminals 13 and 15 is precluded by a short circuit internally of sample 10'. If the lamp glows upon the opening of switch 86, that phenomenon indicates that nothing internal to sample 10' prevents the existence of a voltage between terminals 13, 15 (i. e. across elements 88—89) and that no short circuit there exists.

The control electrode of tube 23 is coupled to the ungrounded terminal of resistor 49 by a resistor 94. With the exception of the features hereinabove pointed out and the provision of switch 79 and its associated calibrating circuits hereinbelow described, the Fig. 2 device is generally similar to the Fig. 1 embodiment in construction and operation.

Coupled to the output of voltage regulating tube 44 is a series combination of resistors 95, 84, 96, 97, and 104, functioning in the aggregate as a voltage divider. Testing voltages are brought out from the junction of resistors 96 and 97 and from a sliding contact on resistor 97 to fixed contacts 98 and 99 of switch 79. The switch has a grounded fixed contact 100 and three other fixed contacts 78, 102 and 103. The switch includes ganged switch arms 101 and 80, so arranged as to close the circuit between contact 100 and arm 101 and to close the circuit between contact 78 and arm 80 when the switch is in a first or testing position, to close the circuit between contact 98 and arm 80 when the switch is in a second position and to close the circuit between contact 99 and arm 80 when the switch is in a third position. Contacts 102 and 103 are connected together. Between the junction of contacts 102, 103 and switch arm 101 there are provided a series resistor 105 and a shunt condenser 106, the purpose of the latter two elements being to simulate sample 10 during calibration of the testing device.

Let it be assumed that 57 volts and 55 volts are the potentials available at contacts 98 and 99, respectively. It will be seen that the testing device may be pre-calibrated so that "thyratron" 26 fires when a voltage of 57 volts is imposed between its plate and ground but does not fire when a voltage of 55 volts is so imposed. This calibration is facilitated by the switching arrangement 79. When the movable contacts of switch 79 are in the first or tesing position terminal 16 is connected to the plate of tube 26 and resistor 105 is connected to ground to discharge condenser 106, so that the potential across terminals 15—16 of sample 10' causes tube 26 to fire. When the switch is in the second position and connects contact 98 to the plate of tube 26, a voltage of 57 volts is impressed on the anode-cathode circuit thereof and tube 26 should fire. When the switch is in the third or 55 volt position tube 26 should not fire if its screen bias is proper. If it does fire this phenomenon is indicated by the stopping of clock 20. Switch 19 is then opened; switch 79 is moved to the first position and then to the second position; and switch 19 is again closed to start clock 20. This causes a voltage of 55 volts to be impressed on tube 26, a voltage which should be insufficient to cause a discharge and therefore clock 20 should continue to run. If the testing device does not meet those tests resistor 64' is adjusted to vary the screen potential on tube 26 until proper calibration is established. When these tests shall have been completed the testing device is calibrated to test the time of charge of the condensers in samples 10' to 57 volts. The purpose of condenser 106 is to insure a sufficient quantity of charge to flash tube 26 positively when the desired potential has been reached. The purpose of resistor 105 is to prevent sparking and contact deterioration when this condenser is connected to ground by placing switch 79 in position for testing, at which switch arm 101 is in circuit with contact 100 and switch arm 80 is in circuit with contact 102. Resistor 105 also prevents short-circuiting of the power supply when switch 79 is in the second or third position and switch 19 is closed.

While it is not proposed that the invention as exemplified by the Fig. 2 embodiment be limited to any specific circuit dimensions the following components have been found practicable in one successful embodiment of the type illustrated in Fig. 2:

| Components: | Characteristics |
|---|---|
| Switch 33' | Single pole single throw. |
| Tube 35' | 5Y3. |
| Condenser 108 | 8 microfarads. |
| Resistor 58' | 10,000 ohms, variable. |
| Resistor 62' | 10,000 ohms, variable. |
| Resistor 63' | 500 ohms, variable. |
| Resistor 64' | 200 ohms. |
| Resistor 94 | 100,000 ohms. |
| Resistor 67' | 100,000 ohms. |
| Resistor 52' | 500 ohms. |
| Resistor 51' | 15,000 ohms. |
| Resistor 105 | 100,000 ohms. |
| Resistor 88 | 250,000 ohms. |
| Resistor 87 | 25,000 ohms. |
| Resistor 104 | 3,000 ohms. |
| Resistor 97 | 500 ohms. |
| Resistor 96 | 2,000 ohms. |
| Resistor 84 | 1,000 ohms. |
| Resistor 95 | 500 ohms. |
| Condenser 66' | 8 microfarads. |

It is apparent that resistors 104, 97, 96, 84 and 95 may be so arranged and adjusted as to calibrate the device for the measurement of time of charge to any voltage within a wide range, so that the 57 volt case presented is an example and not a limitation. Moreover calibration may be made within more narrow limits than the 57 volts–55 volts suggested.

While there have been shown and described what are at present considered to be the preferred embodiments of the present invention it will be obvious to those skilled in the art that various changes and modifications may be made therein without departing from the true scope of the invention and it is, accordingly, intended in the appended claim to cover all such changes and modifications as fall within the true scope of the present invention and without that of the prior art.

We claim:

A testing device for measuring the time of charging of a capacitor to a predetermined potential, said capacitor being arranged in series circuit with a resistance comprising a timer having a control element and adapted to measure the interval of time between initial electrical excitation of said control element and disabling of said timer, means for simultaneously applying electrical potentials to said capacitor and said control element, thereby to increase the potential of said capacitor and to excite said control element, and means coupled to said capacitor and responsive to said predetermined potential for disabling said timer, whereby said timer measures the time for charging said capacitor to said predetermined potential, the last-mentioned means comprising an impedance including an interelectrode path of a gas-filled, grid-biased electron tube which breaks down under threshold starting voltage across said interelectrode path, said impedance being coupled to said capacitor, relay means coupled to said electron tube and responsive to the breakdown current thereof for disabling said timer, and means for varying the bias on said tube for adjusting said threshold voltage.

References Cited in the file of this patent

UNITED STATES PATENTS

| 1,332,844 | Kasson | Mar. 2, 1920 |
| 2,010,968 | Smith | Aug. 13, 1935 |
| 2,217,443 | Hermann | Oct. 8, 1940 |
| 2,251,763 | Shoene | Aug. 5, 1941 |
| 2,274,992 | Nelson | Mar. 3, 1942 |
| 2,313,955 | Martin et al. | Mar. 16, 1943 |
| 2,428,038 | Rothbart | Sept. 30, 1947 |
| 2,430,547 | Anderson et al. | Nov. 11, 1947 |
| 2,504,848 | Kunz | Apr. 18, 1950 |

FOREIGN PATENTS

| 551,910 | Great Britain | Mar. 15, 1943 |